(12) United States Patent
Huang

(10) Patent No.: US 7,517,082 B2
(45) Date of Patent: Apr. 14, 2009

(54) EYEGLASS ASSEMBLY

(76) Inventor: Yung-Ming Huang, 7F, No. 30, Lane 26, Yung-Lo St., Lu-Chou City, Taipei Hsien (TW)

(*) Notice: Subject to any disclaimer, the term of this patent is extended or adjusted under 35 U.S.C. 154(b) by 0 days.

(21) Appl. No.: 11/582,091

(22) Filed: Oct. 16, 2006

(65) Prior Publication Data

US 2008/0088792 A1   Apr. 17, 2008

(51) Int. Cl.
*G02C 5/22* (2006.01)
(52) U.S. Cl. .............. 351/153; 2/13; D16/300; D16/315
(58) Field of Classification Search ........... 351/153; 2/12, 13, 15, 426; D16/300, 303, 315, 320
See application file for complete search history.

(56) References Cited

U.S. PATENT DOCUMENTS

| 411,971 A | * | 10/1889 | Smith | 351/59 |
| 1,545,281 A | * | 7/1925 | Royak | 351/59 |
| 7,018,035 B1 | * | 3/2006 | Herold et al. | 351/60 |

* cited by examiner

*Primary Examiner*—Darryl J Collins
(74) *Attorney, Agent, or Firm*—Frommer Lawrence & Haug LLP; Ronald R Santucci

(57) ABSTRACT

An eyeglass assembly includes a frame unit having two spaced-apart non-looped frame strips and a first bridge interconnecting inner ends of the frame strips, two temples connected pivotally and respectively to the frame strips, an eyeglass unit attached pivotally to the frame unit and having two spaced-apart lens members and a second bridge interconnecting the lens members, and a hinge unit disposed between the frame unit and the eyeglass unit for pivoting the eyeglass unit to the frame unit so that the eyeglass unit is pivotable relative to the frame unit between an in-use position and a non-use position.

8 Claims, 20 Drawing Sheets

EYEGLASS ASSEMBLY

BACKGROUND OF THE INVENTION

1. Field of the Invention

The invention relates to eyeglasses, more particularly to an eyeglass assembly having an eyeglass unit that can be pivoted upwardly and out of the field of vision of the user.

2. Description of the Related Art

Many kinds of eyeglasses are available in the market today. Some eyeglasses have lens members fixed to lens rims of the eyeglasses, while other eyeglasses include main eyeglasses, and auxiliary eyeglasses mounted either removably to the main eyeglasses or pivotally relative to the main eyeglasses. The main eyeglasses may be fixed with near-sighted or far-sighted lens members, while the auxiliary eyeglasses may be fixed with colored lens members. The main eyeglasses are usually connected with lens members that are frequently used by the user and that are fixed respectively within rims of the main eyeglasses.

However, taking for example a user having a far-sighted vision, he/she usually wears corrective eyeglasses to look at nearby objects, and removes the eyeglasses to look at distant objects. These frequent wear and remove movements of the eyeglasses are inconvenient for the user. Although auxiliary eyeglasses may be fixed with corrective lens members, and the main eyeglasses fixed with clear, non-corrective lens members, the user still encounters the problem of having to attach and remove the auxiliary eyeglasses to and from the main eyeglasses. Additionally, the auxiliary eyeglasses are likely to get lost when separated from the main eyeglasses.

Similarly, when wearing sunglasses, the user has to remove the sunglasses when entering a premise, such as a building, a bank, etc., or, when driving into a tunnel or a dark site. These wear and remove actions can easily damage the lens frame and the lens members. The use of auxiliary sunglasses results in the same problems described above with respect to the auxiliary eyeglasses fixed with corrective lens members.

SUMMARY OF THE INVENTION

Therefore, the object of the present invention is to provide an eyeglass assembly that is capable of overcoming the aforementioned drawbacks of the prior art.

According to this invention, an eyeglass assembly comprises a frame unit, two temples, an eyeglass unit, and a hinge unit. The frame unit includes two spaced-apart non-looped frame strips, and a first bridge interconnecting inner ends of the frame strips. The temples are connected pivotally and respectively to the frame strips. The eyeglass unit is attached pivotally to the frame unit, and includes two spaced-apart lens members, and a second bridge interconnecting the lens members. The hinge unit is disposed between the frame unit and the eyeglass unit for pivoting the eyeglass unit to the frame unit so that the eyeglass unit is pivotable relative to the frame unit between an in-use position and a non-use position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
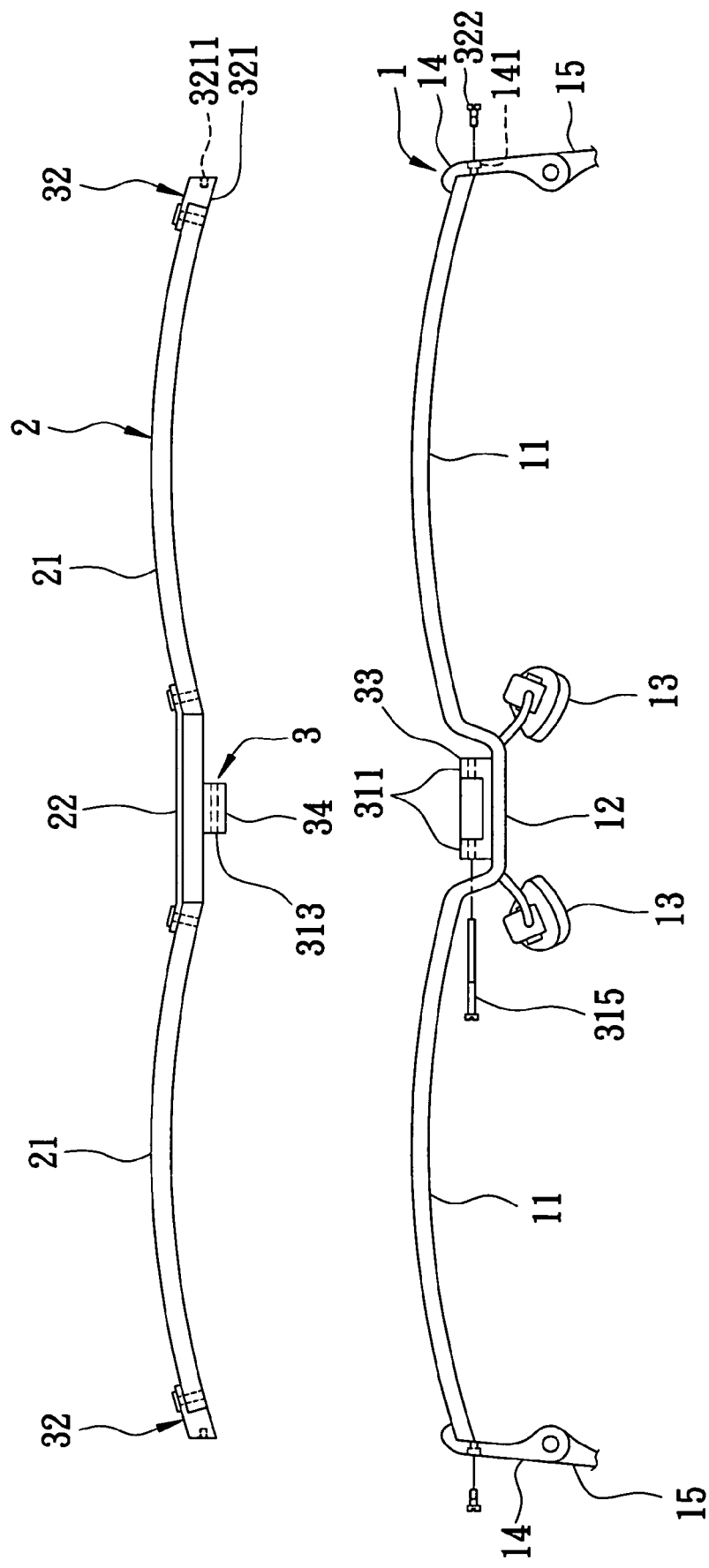
FIG. 1 is an exploded top view of the first preferred embodiment of an eyeglass assembly according to the present invention.

Before the present invention is described in greater detail, it should be noted that like elements are denoted by the same reference numerals throughout the disclosure.

Referring to FIGS. 1 to 8, the first preferred embodiment of an eyeglass assembly according to the present invention is shown to comprise a frame unit 1, an eyeglass unit 2, and a hinge unit 3.

The frame unit 1 includes two spaced-apart non-looped frame strips 11, a first bridge 12 interconnecting inner ends of the frame strips 11, two nose pads 13 respectively connected to the inner ends of the frame strips 11 below the first bridge 12, and two connectors 14 respectively connected to outer ends of the frame strips 11 opposite to the first bridge 12. Two temples 15 are connected pivotally and respectively to the outer ends of the frame strips 11 through the connectors 14.

The eyeglass unit 2 is attached pivotally to the frame unit 1, and includes two spaced-apart lens members 21, and a second bridge 22 interconnecting the lens members 21.

Figure 4:
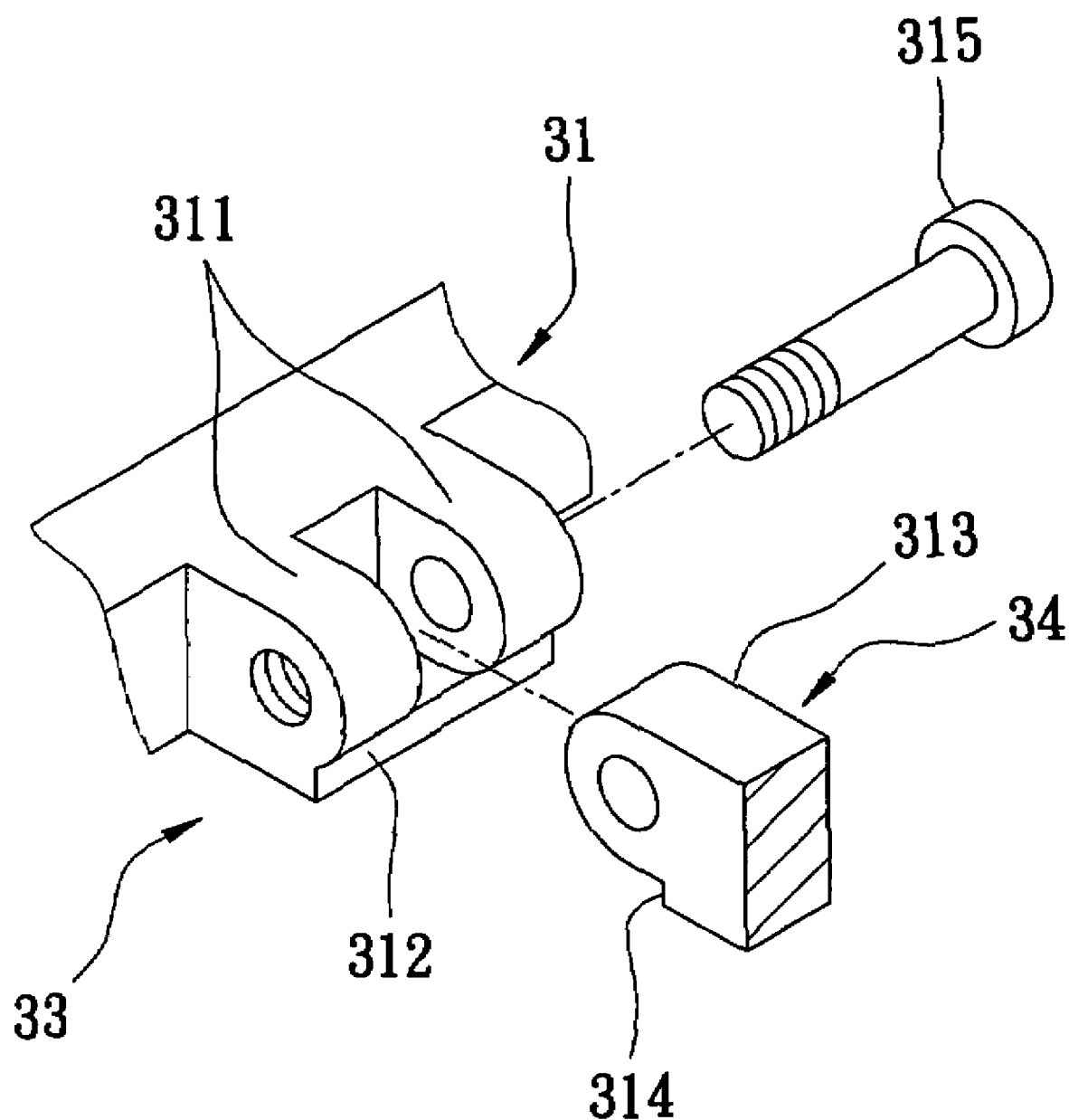
FIG. 4 is an enlarged exploded perspective view of an intermediate hinge of a hinge unit of the first preferred embodiment.

The hinge unit 3 is disposed between the frame unit 1 and the eyeglass unit 2, and includes an intermediate hinge 31 and two lateral hinges 32. The intermediate hinge 31 has a first hinge part 33 projecting from the first bridge 12, a second hinge part 34 projecting from the second bridge 22, and a first hinge pin 315 to interconnect pivotally the first and second hinge parts 33, 34. As shown in FIG. 4, the first hinge part 33 has two spaced-apart first lugs 311, and a web 312 interconnecting the first lugs 311. The second hinge part 34 has a second lug 313 inserted between the first lugs 311 above the web 312, and a downward projection having an abutment surface 314 abutting against the web 312. The first hinge pin 315 is inserted into the first and second lugs 311, 313.

The lateral hinges 32 connect pivotally and respectively outer ends of the lens members 21 to the connectors 14. Each of the lateral hinges 32 has a lateral hinge part 321 fixed to the outer end of the respective lens member 21, and a second hinge pin 322 extending through one of the connectors 14 and inserted into the lateral hinge part 321. The lateral hinge part 321 has an end face contacting one of the connectors 14 and having a blind hole 3211. Each connector 14 has a through hole 141 aligned with the blind hole 3211. The second hinge pin 322 extends through the through hole 141 and into the blind hole 3211.

Figure 3:
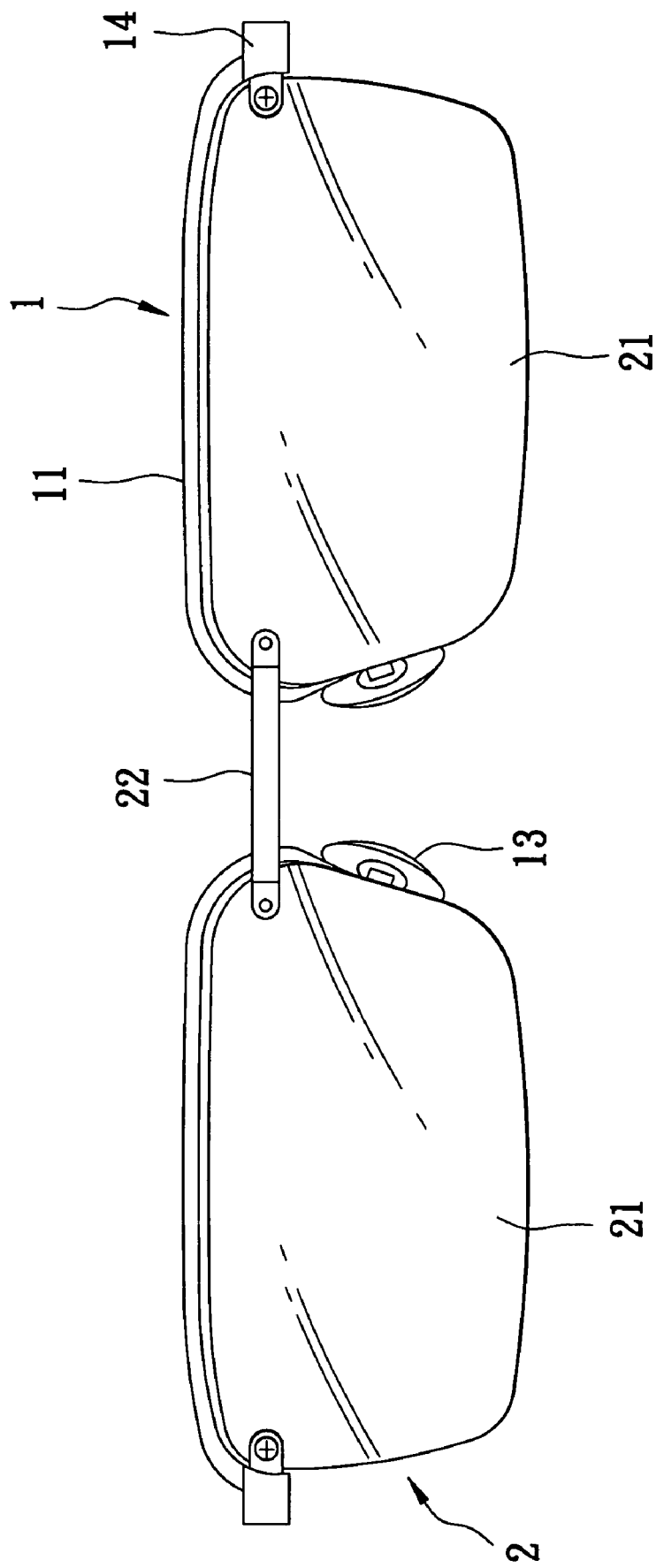
FIG. 3 is a schematic front view of the first preferred embodiment.
Figure 7:
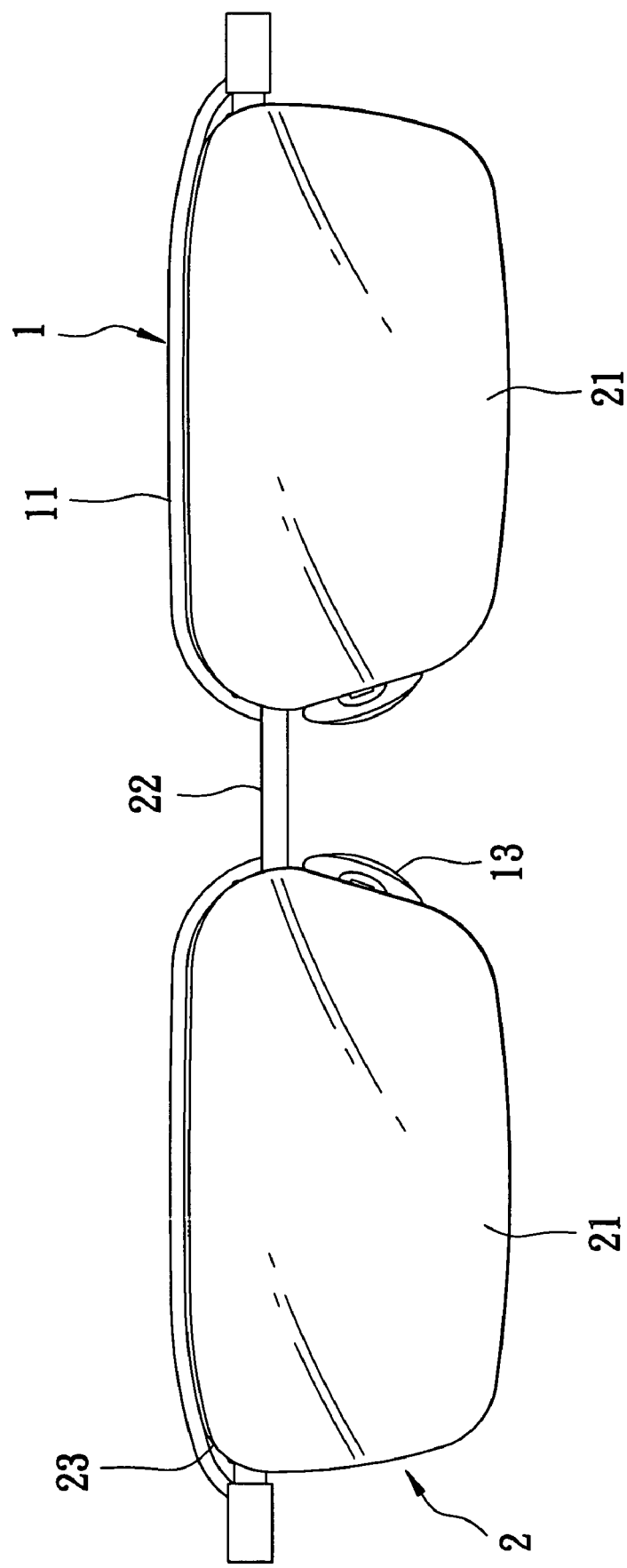
FIG. 7 is a view similar to FIG. 3, but illustrating a frame unit of the first preferred embodiment provided with partly enclosing lens rims.
Figure 8:
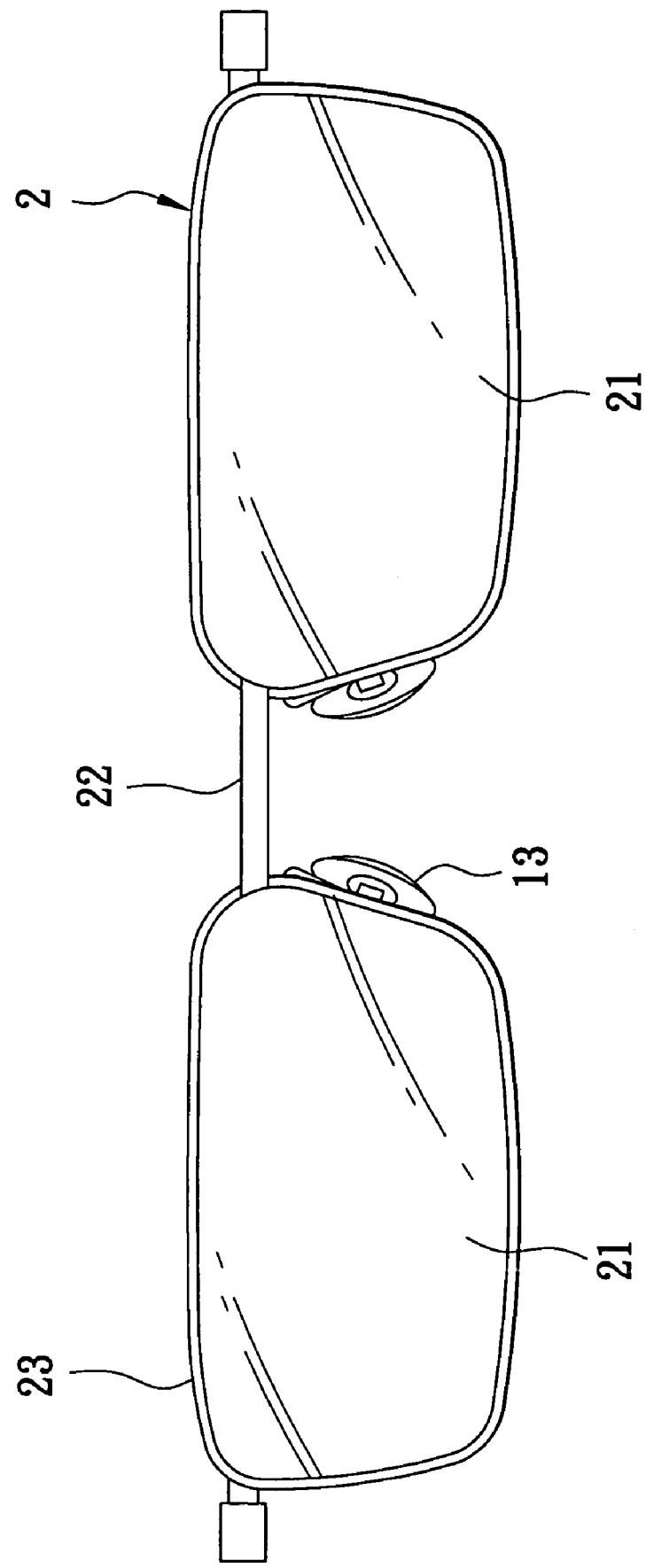
FIG. 8 is a view similar to FIG. 7, but with the frame unit provided with fully enclosing lens rims.
Figure 9:
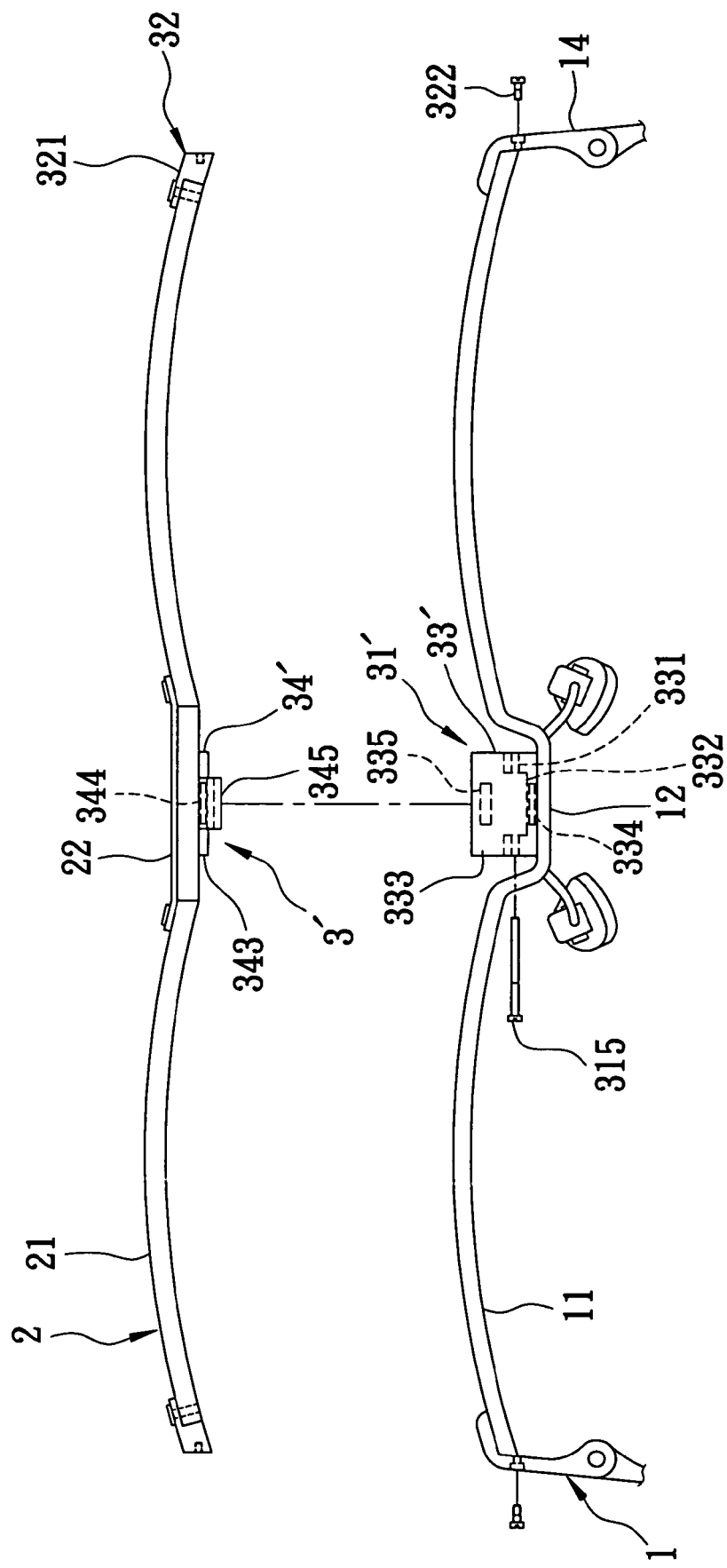
FIG. 9 is an exploded top view of the second preferred embodiment of an eyeglass assembly according to the present invention.
Figure 10:
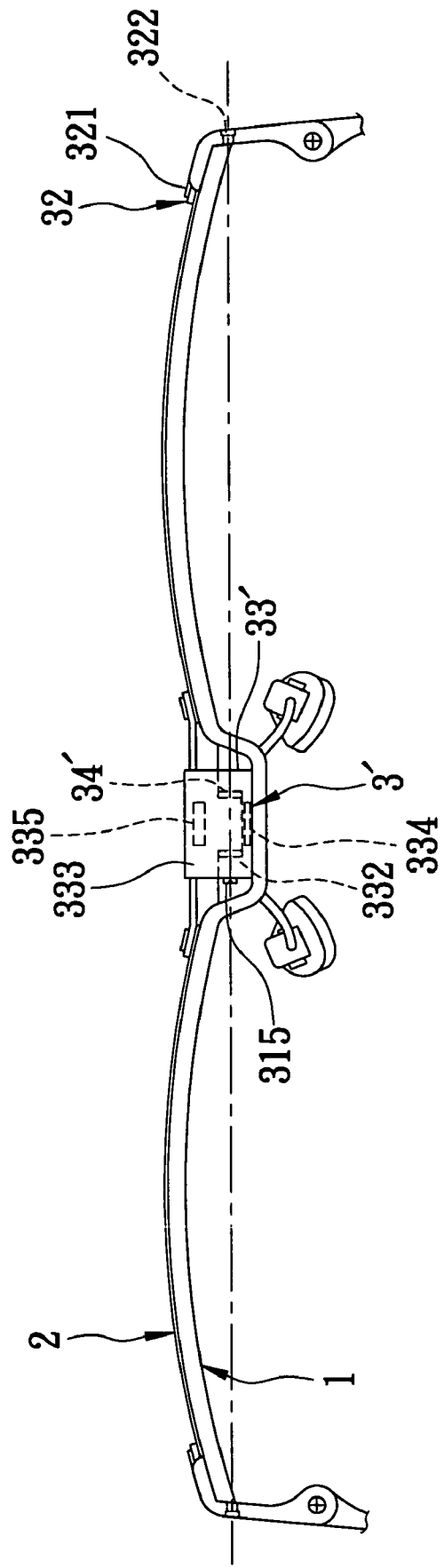
FIG. 10 is an assembled top view of the second preferred embodiment.
Figure 11:
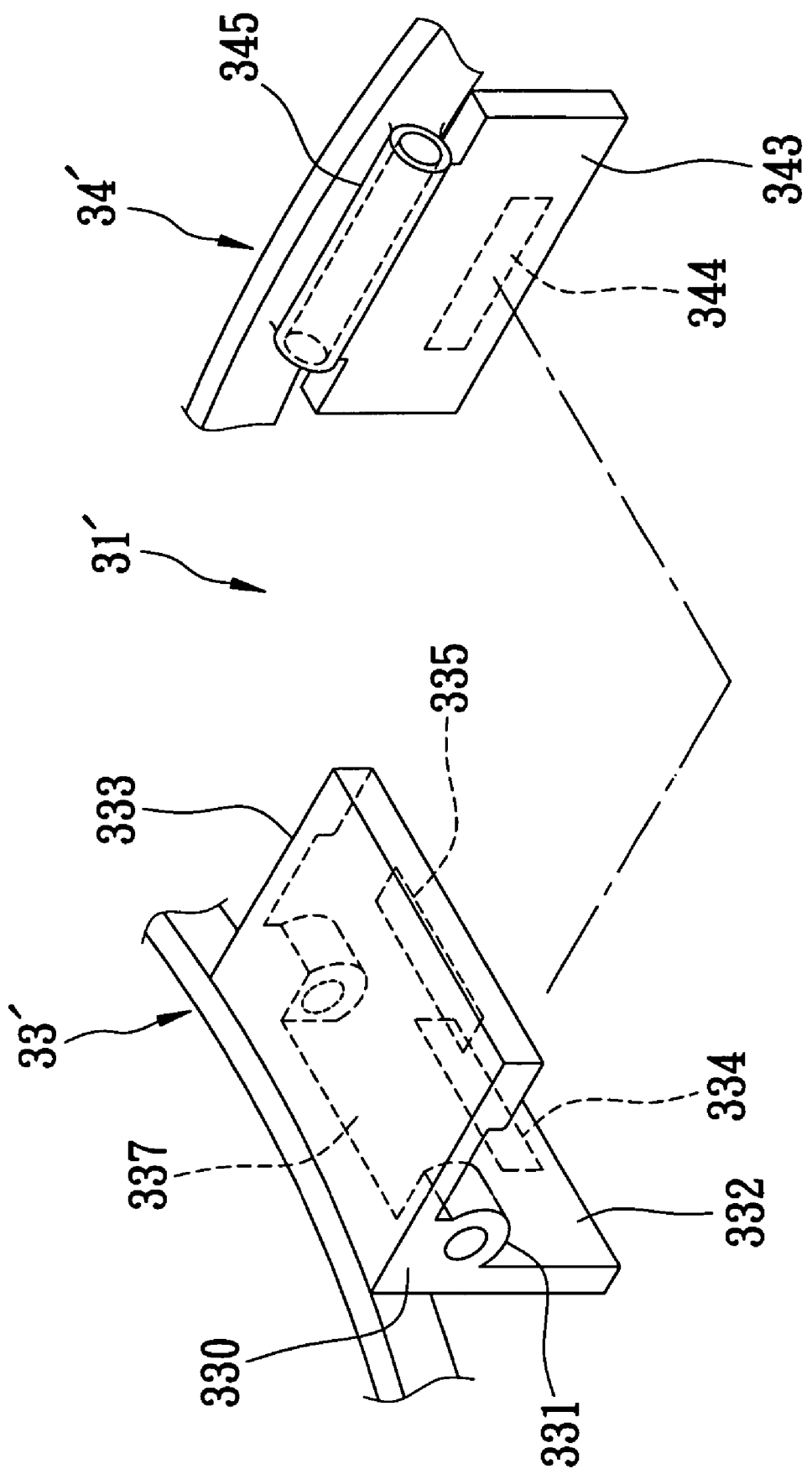
FIG. 11 is an exploded perspective view of an intermediate hinge of the second preferred embodiment.

In this embodiment, the lens members 21 of the eyeglass unit 2, as shown in FIG. 3, are not provided with lens rims. However, the eyeglass unit 2 is not limited to this configuration. As shown in FIGS. 7 and 8, the eyeglass unit 2 may further include two lens rims 23 connected respectively to the lens members 21. In such a case, the second bridge 22 interconnects the lens rims 23, and the lateral hinge parts 321 of the lateral hinges 32 are fixed respectively to the lens rims 23. The lens rims 23 may partly surround outer peripheries of the lens members 21, as shown in FIG. 7, or may fully surround the outer peripheries of the lens members 21, as shown in FIG. 8.

Figure 2:
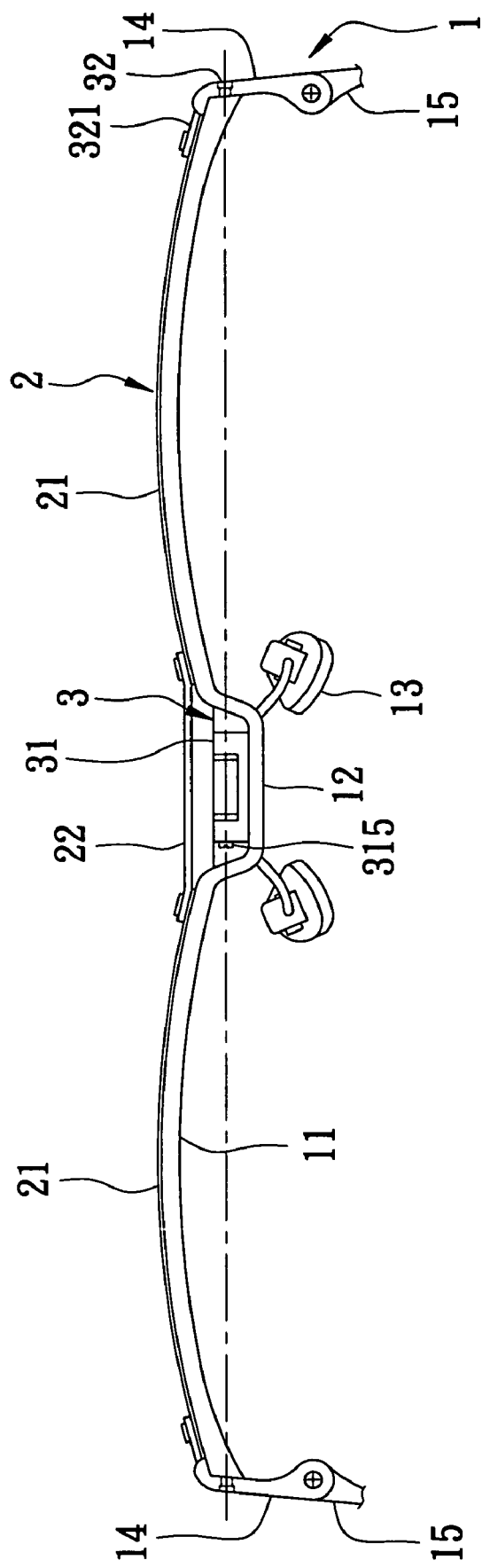
FIG. 2 is an assembled top view of the first preferred embodiment.
Figure 5:
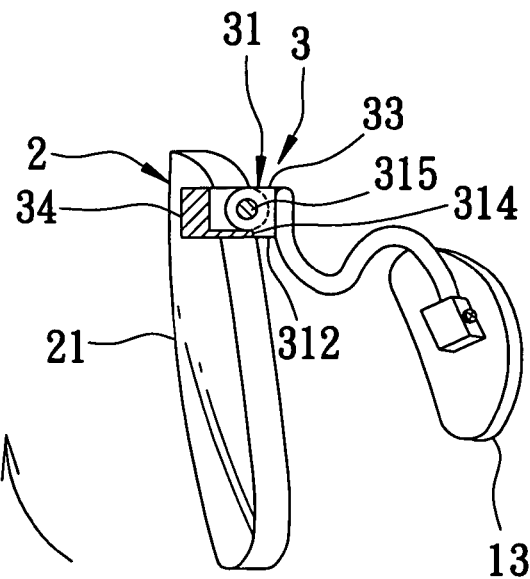
FIG. 5 is a fragmentary partly sectional view of the first preferred embodiment, illustrating an eyeglass unit in an in-use position.
Figure 6:
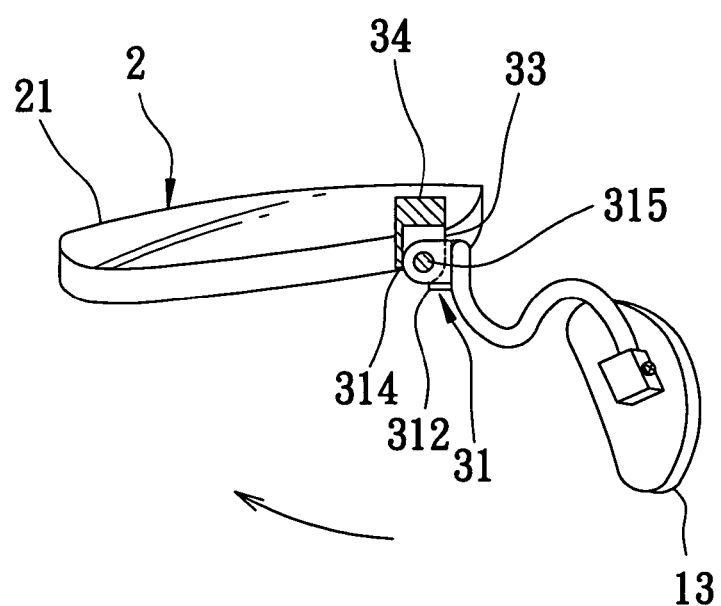
FIG. 6 is a view similar to FIG. 5, but with the eyeglass unit in a non-use position.

With reference to FIGS. 1, 2, and 4, when the first hinge pin 315 interconnects the first and second hinge parts 33, 34, and when the second hinge pins 322 of the lateral hinges 32 interconnect the connectors 14 and the lateral hinge parts 321, the eyeglass unit 2 is pivotable relative to the frame unit 1 between an in-use position shown in FIG. 5 and a non-use position shown in FIG. 6. Further, through the first and second hinge pins 315, 322, the degree of tightening between the first and second hinge parts 33, 34 and between the connectors 14 and the lateral hinge parts 321 can be adjusted so as to position temporarily the eyeglass unit 2 at a preferred non-use position. Additionally, with the provision of the intermediate and lateral hinges 31, 32 on the eyeglass assembly of the present invention, interconnection between the eyeglass unit 2 and the frame unit 1 is stable.

When the eyeglass unit 2 is at the in-use position, as shown in FIG. 5, the web 312 of the first hinge part 33 and the abutment surface 314 of the second hinge part 34 abut against each other. If the lens members 21 are not needed temporarily, the user can simply pivot the eyeglass unit 2 outwardly and upwardly relative to the frame unit 1 with the first and second hinge pins 315, 322 serving as pivot axes so that the eyeglass unit 2 is moved from the in-use position to the non-use position shown in FIG. 6. When the eyeglass unit 2 is at the non-use position, the web 312 and the abutment surface 314 are spaced apart from each other, and the lens members 21 are moved temporarily out of the field of vision of the user. Hence, the user does not have to remove the entire eyeglass assembly when the eyeglass unit 2 is not needed, thereby rendering the eyeglass assembly of the present invention very convenient and easy to use. Further, pivoting movement of the eyeglass unit 2 relative to the frame unit 1 is limited through abutment between the web 312 and the abutment surface 314.

The eyeglass assembly of the present invention may be used to realize, for example, corrective eyeglasses or sunglasses. When the lens members 21 are of the corrective type, the user need only pivot upwardly the eyeglass unit 2 when unneeded. Further, when the lens members 21 are colored, the user similarly pivots upwardly the eyeglass unit 2 when unneeded, thereby moving the colored lens members 21 out of his/her field of vision.

Referring to FIGS. 9 to 14, the second preferred embodiment of an eyeglass assembly according to the present invention is shown to be similar to the first preferred embodiment. However, in this embodiment, the first hinge part 33' of the intermediate hinge 31' of the hinge unit 3' has a first projecting plate 332 projecting downwardly from the first bridge 12, a second projecting plate 333 extending forwardly from a top end of the first projecting plate 332, a corner 330 between the first and second projecting plates 332, 333, a pivot portion 331 disposed between the first and second projecting plates 332, 333 and at the corner 330, first and second magnet members 334, 335 embedded respectively in the first and second projecting plates 332, 333, and a groove 337 formed in the pivot portion 331.

The second hinge part 34' of the intermediate hinge 31' has a third projecting plate 343 projecting from the second bridge 22, a projection 345 protruding into the groove 337 from the third projecting plate 343, and a magnetic member 344 embedded in the third projecting plate 343 to be attracted by the first or second magnet member 334, 335. The first hinge pin 315 of the hinge unit 3' is inserted into the pivot portion 331 and the projection 345 so as to position the projection 345 on the pivot portion 331 and so as to restrict pivoting movement of the projection 345 within the groove 337. The second hinge part 34' is rotatable relative to the first hinge part 33' through the first hinge pin 315, and brings the eyeglass unit 2 to pivot relative to the frame unit 1 between an in-use position and a non-use position. The eyeglass unit 2 obtains positioning through the two lateral hinges 32 and magnetic attraction between the magnetic member 344 and the first or second magnet member 334, 335.

When the eyeglass unit 2 is in the in-use position, the third projecting plate 343 of the second hinge part 34' abuts against the first projecting plate 332 of the first hinge part 33', and is positioned thereto through magnetic attraction between the first magnet member 334 and the magnetic member 344. The lens members 21 are located in the field of vision of the user at this time.

When the lens members 21 are not needed, the user simply moves upwardly the eyeglass unit 2 so as to pivot the third projecting plate 343 away from the first projecting plate 332 until the third projecting plate 343 abuts against the second projecting plate 333 of the first hinge part 33'. At this time, the magnetic member 344 is positioned on the second projecting plate 333 through magnetic attraction between the second magnet member 335 and the magnetic member 344. The eyeglass unit 2 is in the non-use position at this time. Hence, the lens members 21 can be moved away from the field of vision of the user without the need to remove the entire eyeglass assembly.

When the lens members 21 are again needed, the user simply moves downwardly the eyeglass unit 2 so as to pivot the third projecting plate 343 away from the second projecting plate 333 until the third projecting plate 343 abuts against the first projecting plate 332. At this time, through magnetic attraction between the magnetic member 344 and the first magnet member 334, the eye glass unit 2 is positioned in the in-use position.

Figure 12:
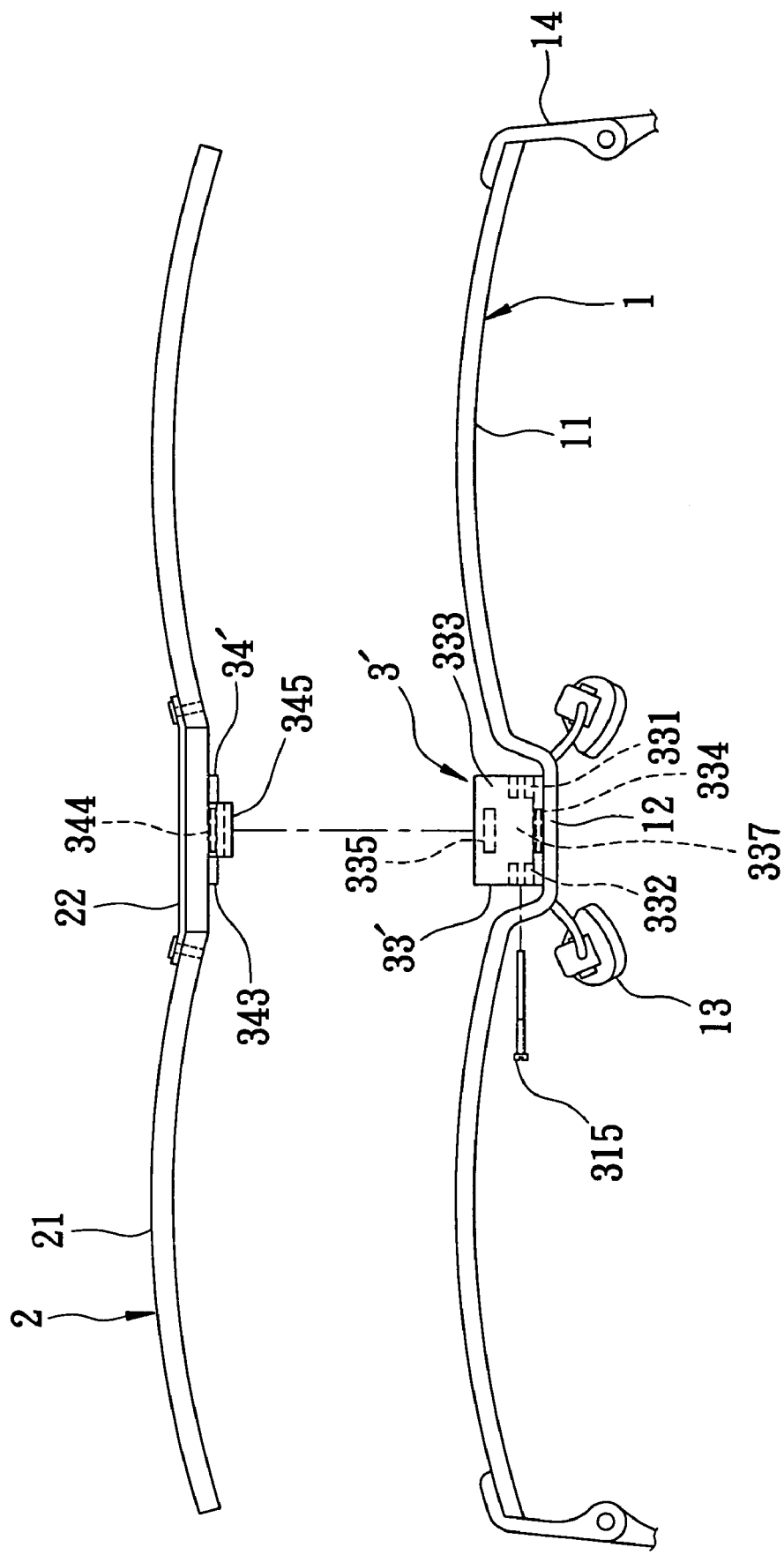
FIG. 12 is a view similar to FIG. 9, but without two lateral hinges.
Figure 13:
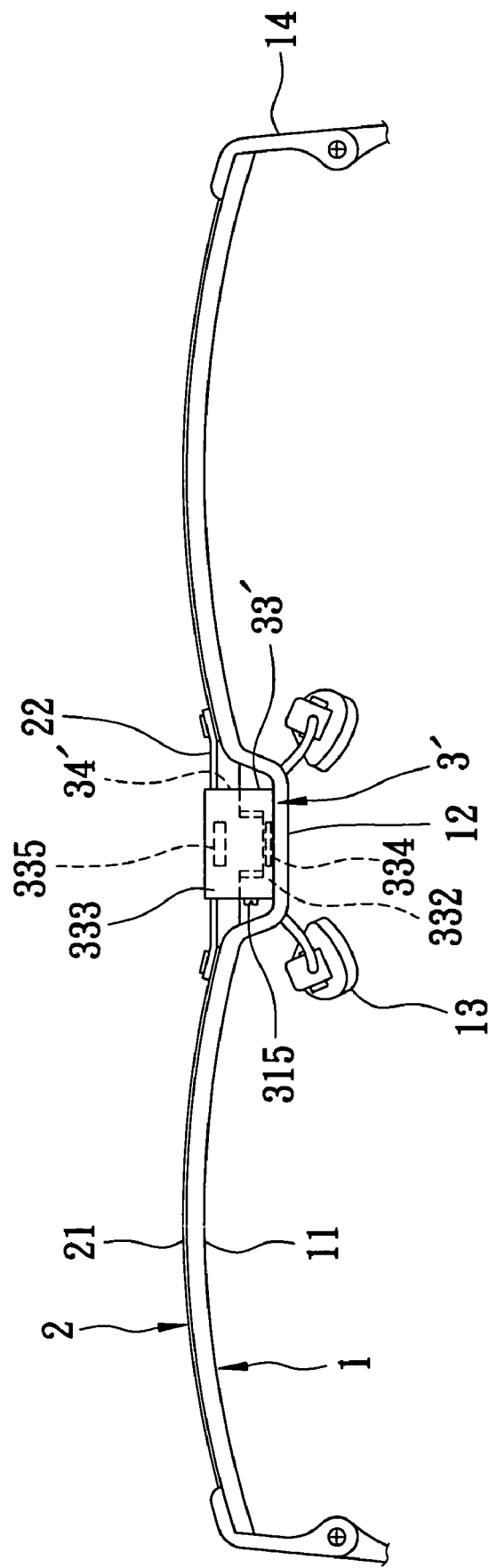
FIG. 13 is an assembled top view of FIG. 12.
Figure 14:
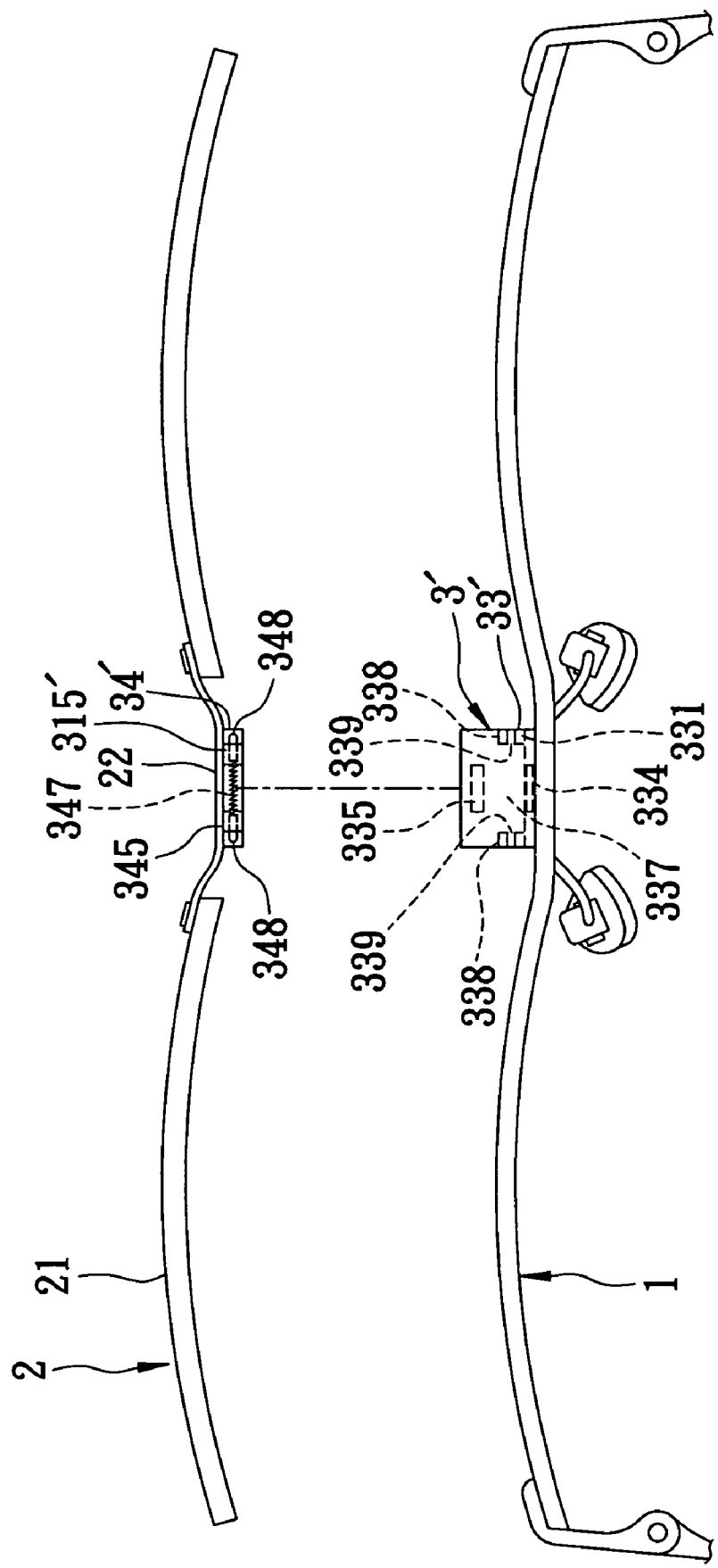
FIG. 14 is a view similar to FIG. 12, but illustrating an alternative form of the intermediate hinge of the second preferred embodiment.
Figure 15:
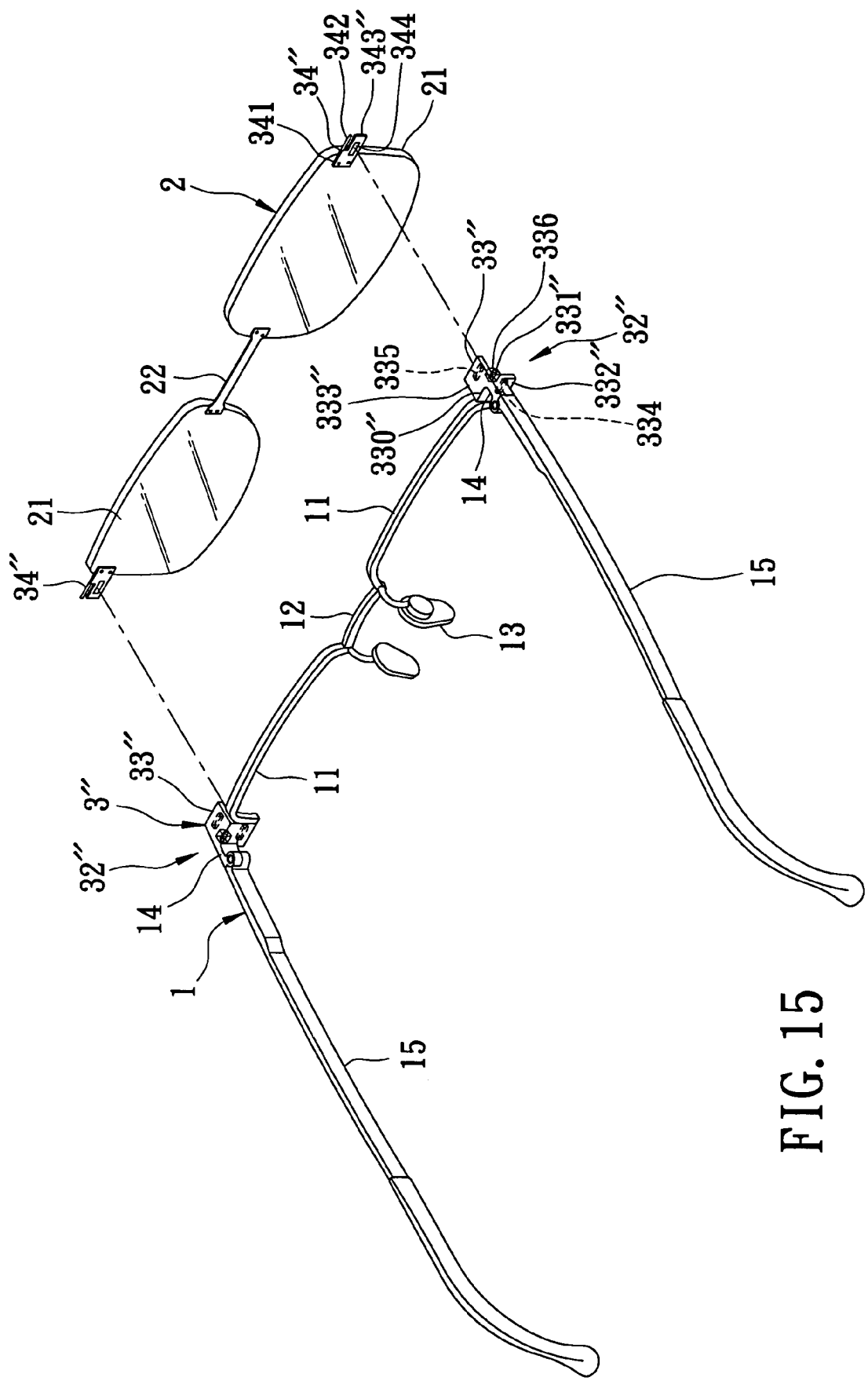
FIG. 15 is an exploded perspective view of the third preferred embodiment of an eyeglass assembly according to the present invention.

In an alternative embodiment, the lateral hinges 32 of the hinge unit 3' may be omitted from the eyeglass assembly, as shown in FIGS. 12 and 13. In another alternative embodiment, as shown in FIG. 14, the first hinge pin 315' of the intermediate hinge 31' has a spring member 347 embedded in the projection 345 of the second hinge part 34', and two hinge pin portions 348 disposed on two opposite ends of the spring member 347 and extending outwardly of the projection 345. The pivot portion 331 is provided with two spaced-apart positioning pieces 338, and two spaced-apart aligned pin holes 339 formed in the respective positioning pieces 338. The groove 337' is formed between the positioning pieces 338. The hinge pin portions 348 are pressed toward each other so as to compress the spring member 347 and permit the projection 345 to be received in the groove 337', and are then released so as to be biased by the spring member 347 to engage rotatably and respectively the pin holes 339. As such, the second hinge part 34' is connected pivotally to the first hinge part 33', and similarly, the eyeglass unit 2 can pivot relative to the frame unit 1 between the in-use position and the non-use position.

Referring to FIGS. 15 to 21, the third preferred embodiment of an eyeglass assembly according to the present invention is shown to be similar to the second preferred embodiment. However, in this embodiment, the hinge unit 3" includes two lateral hinges 32" connecting pivotally and respectively the outer ends of the lens members 21 to the outer ends of the frame strips 11. The lateral hinges 32" have two third hinge parts 33" that are fixed respectively to the outer ends of the frame strips 11 opposite to the first bridge 12, and two fourth hinge parts 34" that are fixed respectively to the outer ends of the lens members 21 and that are connected pivotally and respectively to the third hinge parts 33".

The third hinge parts 33" are fixed respectively to the connectors 14, which in turn are fixed to the respective outer ends of the frame strips 11 and are connected pivotally to the respective temples 15. Each of the third hinge parts 33" has a fourth projecting plate 332" projecting downwardly from the respective connector 14, a fifth projecting plate 333" projecting forwardly from the fourth projecting plate 332", a corner 330"between the fourth and fifth projecting plates 332", 333", a pivot portion 331" disposed at the corner 330" and having a pivot hole 336, and two magnets 334, 335 embedded respectively in the fourth and fifth projecting plates 332", 333".

Each of the fourth hinge parts 34" has a main body 341 fixed to the outer end of the respective lens member 21, a sixth projecting plate 343" extending outwardly from the main body 341 and protruding from the outer end of the respective lens member 21 to contact the fourth or fifth projecting plate 332", 333", a second hinge pin 342 extending parallel to the sixth projecting plate 343" and inserted into the pivot hole 336, and a magnetic member 344 embedded in the sixth projecting plate 343" to be attracted by the magnets 334, 335.

Preferably, the first bridge 12 is made integral with the frame strips 11, and the pivot portion 331" and the fourth and fifth projecting plates 332", 333" are made integral with the frame unit 1. As such, assembly can be simplified, the number of components of the frame unit 1 can be reduced, and loose connection among components due to long term use can also be prevented.

Figure 16:
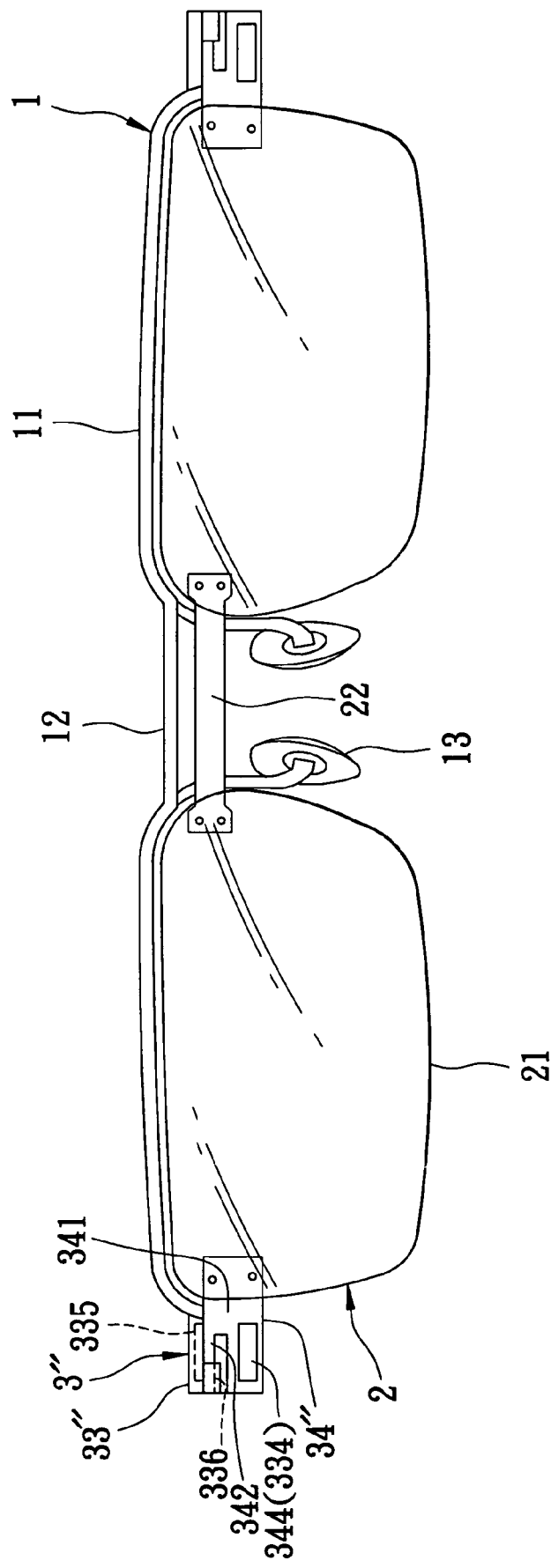
FIG. 16 is an assembled schematic view of the third preferred embodiment.
Figure 17:
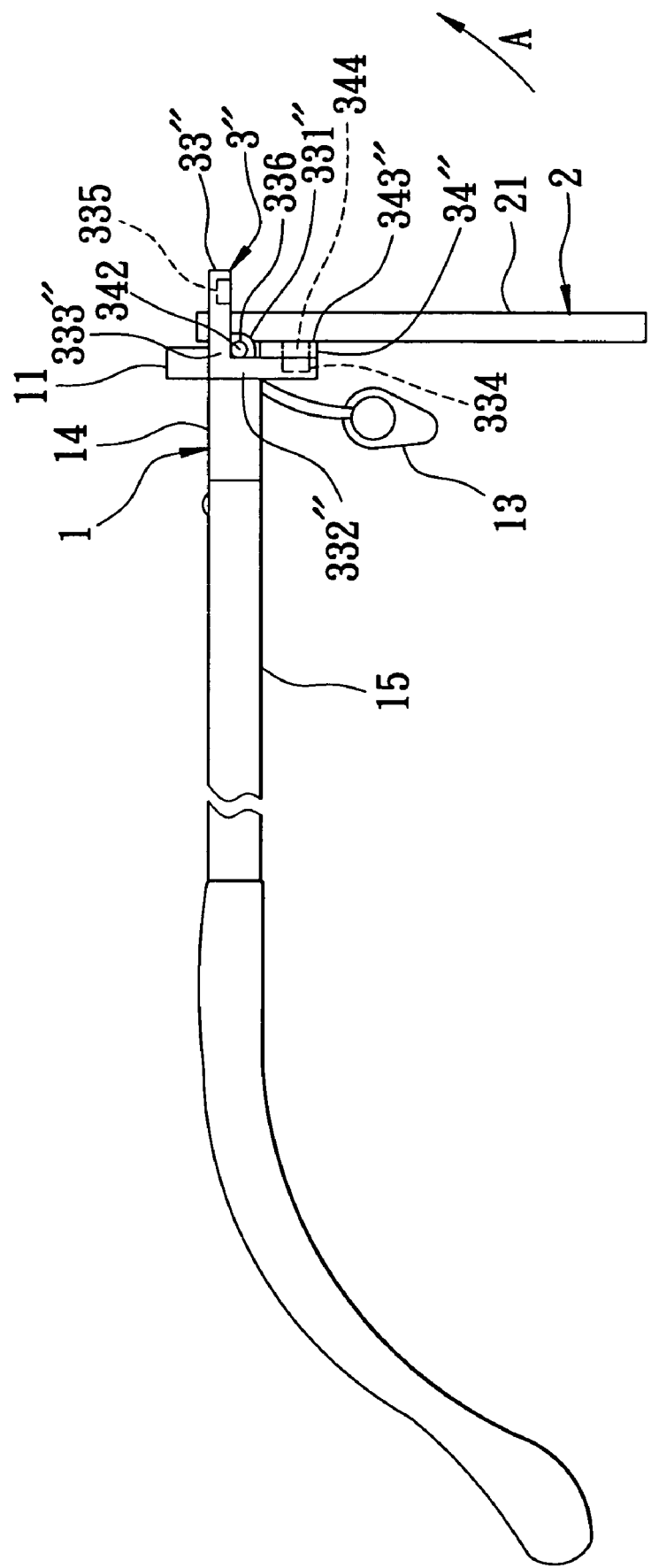
FIG. 17 is a fragmentary side view of the third preferred embodiment, illustrating an eyeglass unit in an in-use position.

During assembly, the eyeglass unit 2 is mounted pivotally on the frame unit 1 through the third and fourth hinge parts 33", 34". When the eyeglass unit 2 is in the in-use position, as shown in FIGS. 16 and 17, the second bridge 22 is located below the first bridge 12 so as to facilitate pivoting movement of the eyeglass unit 2 relative to the frame unit 1, and the sixth projecting plates 343" of the second hinge parts 34" abut respectively against the fourth projecting plates 332" and are positioned thereto through magnetic attraction between the magnetic members 344 and the respective magnets 334. At this time, the lens members 21 are located in the field of vision of the user.

Figure 18:
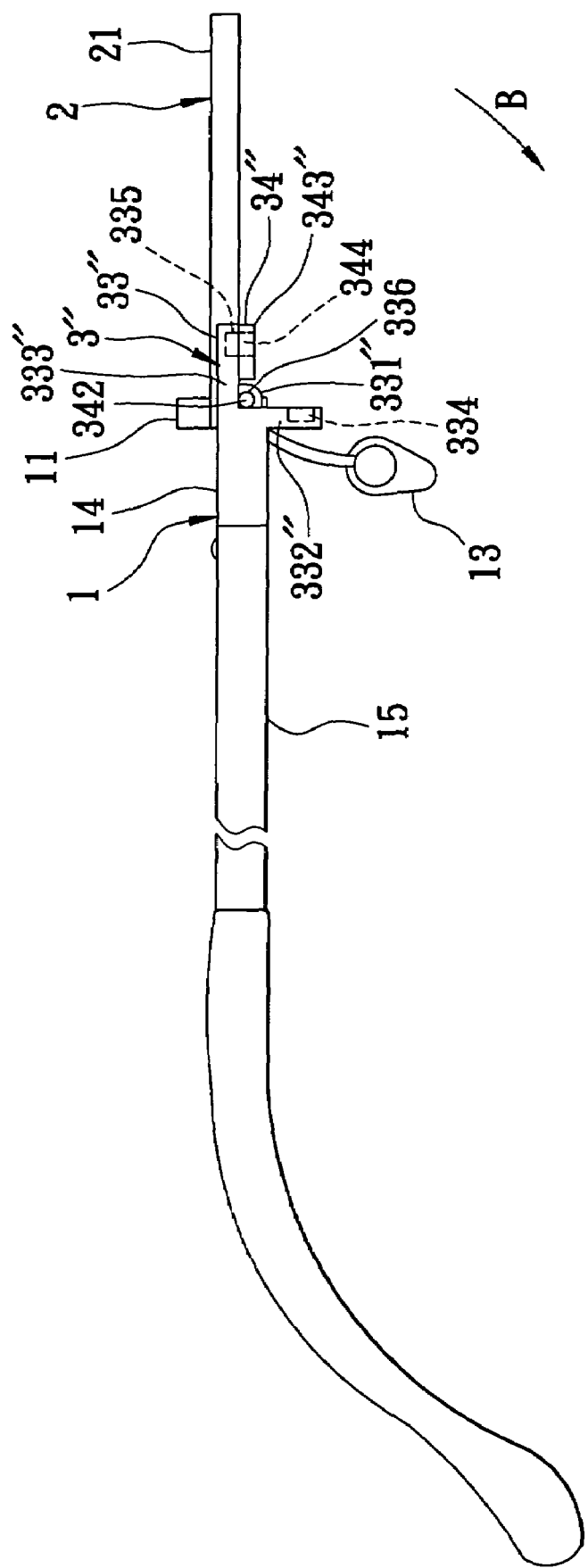
FIG. 18 is a view similar to FIG. 17, but with the eyeglass unit in a non-use position.

When the lens members 21 are not needed, the user simply moves the eyeglass unit 2 upwardly so as to pivot simultaneously the sixth projecting plates 343" of the second hinge parts 34" in the direction of an arrow (A) shown in FIG. 17 until the sixth projecting plates 343" abut respectively against the fifth projecting plates 333" of the first hinge parts 33". At this time, the magnetic members 344 are attracted to the respective magnets 335, thereby positioning the sixth projecting plates 343" on the fifth projecting plates 333", respectively. Consequently, the eyeglass unit 2 is positioned in the non-use position, as shown in FIG. 18. Hence, the lens members 21 can be moved away from the field of vision of the user without having to remove the eyeglass assembly.

When the lens members 21 are needed, the user simply moves downwardly the eyeglass unit 2 so as to pivot simultaneously the sixth projecting plates 343" away from the fifth projecting plates 333" in the direction of an arrow (B) shown in FIG. 18 until the sixth projecting plates 343" abut respectively against the fourth projecting plates 332". At this time, the eyeglass unit 2 is positioned in the in-use position through magnetic attraction between the magnetic members 344 and the magnets 334.

Figure 19:
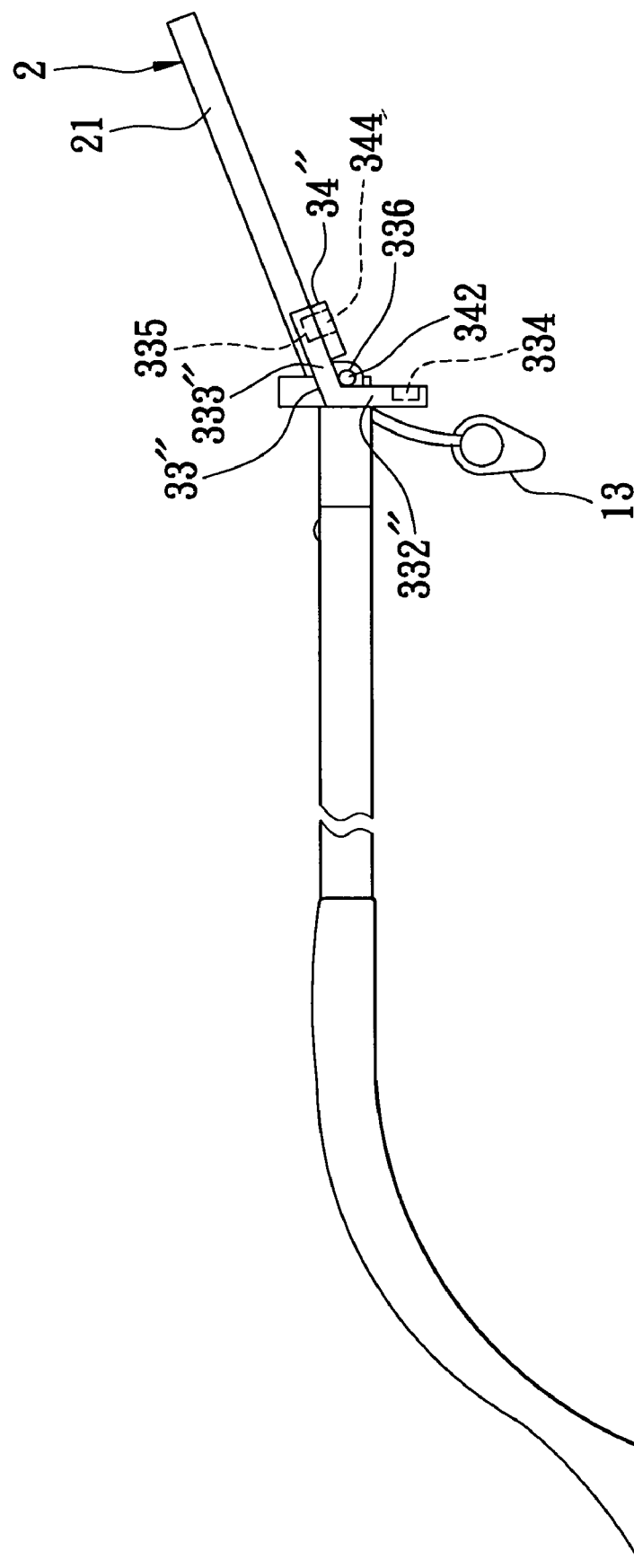
FIG. 19 illustrates an alternative form of a lateral hinge of a hinge unit of the third preferred embodiment.

It should be noted that in this embodiment, each of the fourth projecting plates 332" is substantially perpendicular to the respective fifth projecting plate 333". In an alternative embodiment, the fourth projecting plate 332" may be inclined with respect to the fifth projecting plate 333", as shown in FIG. 19. Similarly, the eyeglass unit 2 can be pivoted upwardly to the non-use position with the lens members 21 located away from the field of vision of the user.

Figure 20:
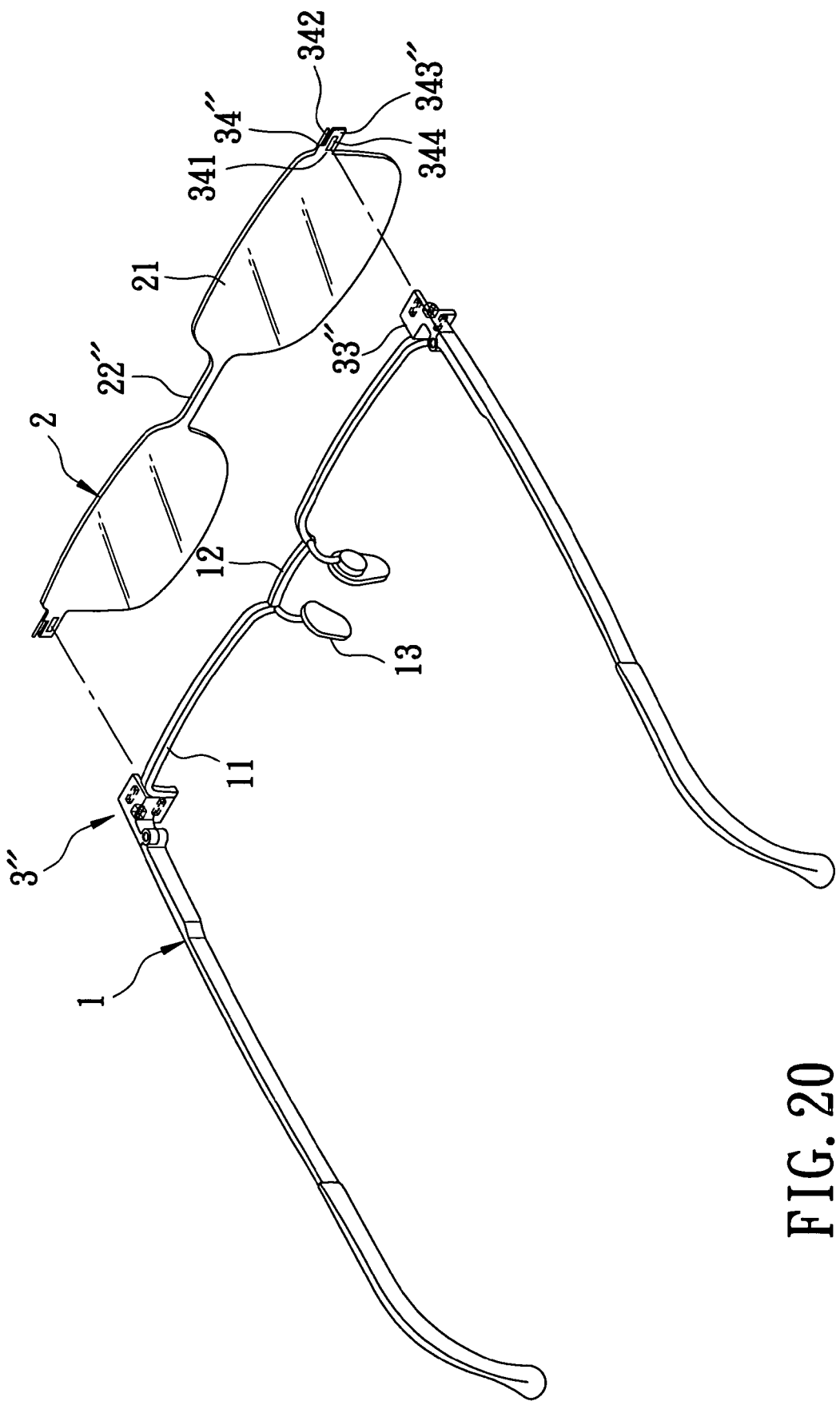
FIG. 20 illustrates an alternative form of an eyeglass unit of the third preferred embodiment.
Figure 21:
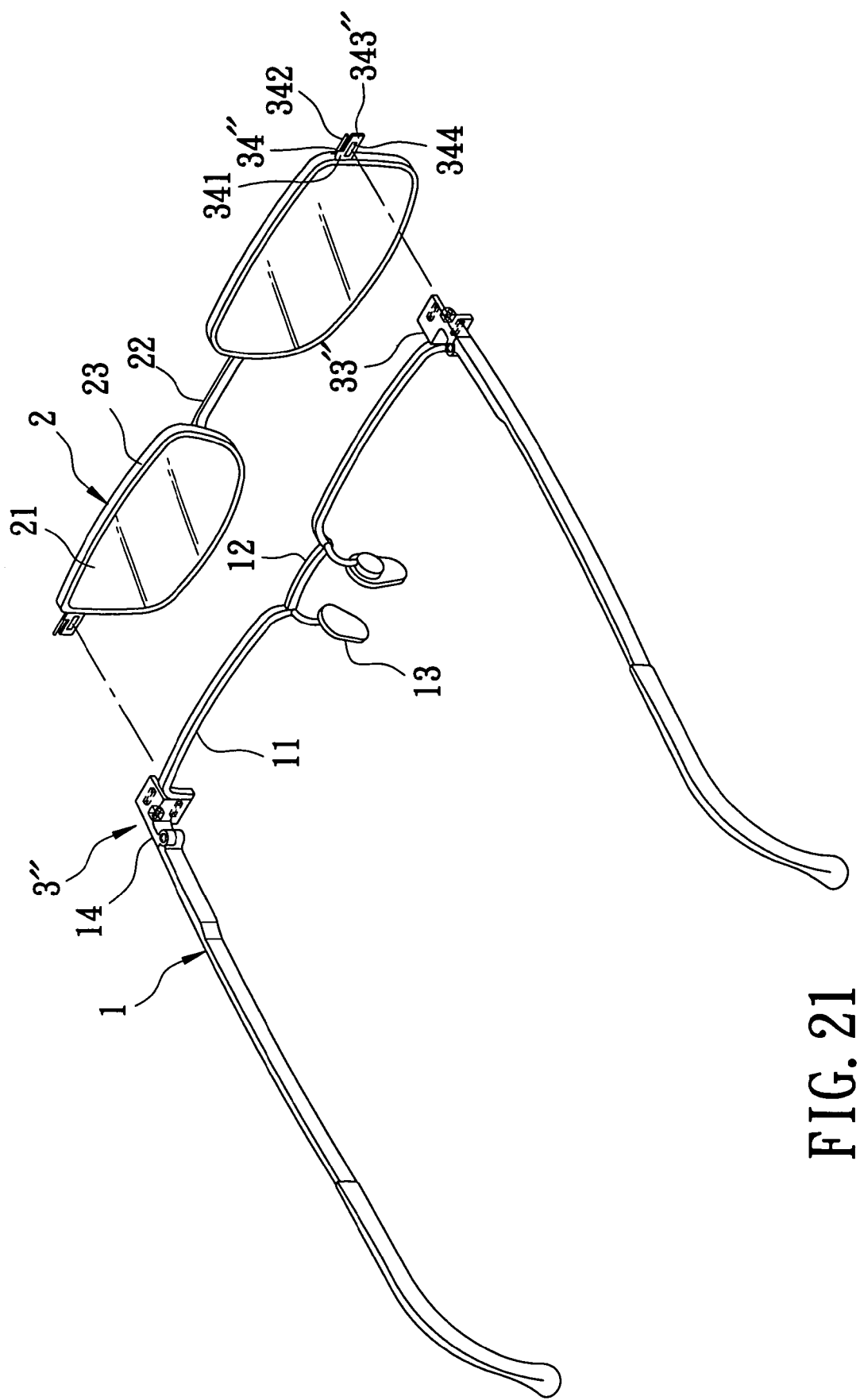
FIG. 21 illustrates the eyeglass unit of the third preferred embodiment provided with lens rims.

In another alternative embodiment, the second bridge 22" and the second hinge parts 34" may be formed integrally with the lens members 21, as shown in FIG. 20. In still another alternative embodiment, as shown in FIG. 21, each of the lens members 21 has a lens rim 23. The second bridge 22 interconnects the lens members 21.

The advantages of the first and second preferred embodiments can be similarly attained using the third preferred embodiment.

In the aforementioned embodiments, the magnetic member 344 is configured as a magnet. Alternatively, the magnetic member 344 may be a metal to which the first or second magnet member 334, 335 is attracted.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An eyeglass assembly comprising:
a frame unit including two spaced-apart non-looped frame strips, and a first bridge interconnecting inner ends of said frame strips;
two temples connected pivotally and respectively to said frame strips;

two connectors fixed respectively to outer ends of said frame strips opposite to said first bridge and connected pivotally and respectively to said temples;

an eyeglass unit attached pivotally to said frame unit, and including two spaced-apart lens members, and a second bridge interconnecting said lens members; and a hinge unit disposed between said frame unit and said eyeglass unit for pivoting said eyeglass unit to said frame unit so that said eyeglass unit is pivotable relative to said frame unit between an in-use position and a non-use position, said hinge unit including two lateral hinges connecting pivotally and respectively outer ends of said lens members to said connectors.

2. The eyeglass assembly of claim 1, wherein said hinge unit further includes an intermediate hinge having a first hinge part projecting from said first bridge, a second hinge part projecting from said second bridge, and a first hinge pin to interconnect pivotally said first and second hinge parts.

3. The eyeglass assembly of claim 1, wherein each of said lateral hinges has a lateral hinge part fixed to said outer end of said respective lens member, and a second hinge pin extending through one of said connectors and inserted into said lateral hinge part.

4. The eyeglass assembly of claim 1, wherein said hinge unit includes a first hinge part projecting from said frame unit, a second hinge part projecting from said eyeglass unit, and a hinge pin to interconnect pivotally said first and second hinge parts, said first hinge part having a first projecting plate projecting from said frame unit, a second projecting plate extending forwardly from said first projecting plate, a corner between said first and second projecting plates, a pivot portion disposed between said first and second projecting plates and at said corner, and first and second magnet members embedded respectively in said first and second projecting plates, said second hinge part having a third projecting plate provided on said eyeglass unit, a projection protruding from said third projecting plate and pivoted to said pivot portion, and a magnetic member embedded in said third projecting plate to be attracted by one of said first and second magnet members.

5. An eyeglass assembly comprising:

a frame unit including two spaced-apart non-looped frame strips, and a first bridge interconnecting inner ends of said frame strips;

two temples connected pivotally and respectively to said frame strips;

an eyeglass unit attached pivotally to said frame unit, and including two spaced-apart lens members, and a second bridge interconnecting said lens members; and a hinge unit disposed between said frame unit and said eyeglass unit for pivoting said eyeglass unit to said frame unit so that said eyeglass unit is pivotable relative to said frame unit between an in-use position and a non-use position, said hinge unit including an intermediate hinge having a first hinge part projecting from said first bridge, a second hinge part projecting from said second bridge, and a first hinge pin to interconnect pivotally said first and second hinge parts;

wherein said first hinge part has a first projecting plate projecting from said first bridge, a second projecting plate extending forwardly from said first projecting plate, a corner between said first and second projecting plates, a pivot portion disposed between said first and second projecting plates and at said corner, and first and second magnet members embedded respectively in said first and second projecting plates, said second hinge part having a third projecting plate provided on said second bridge, a projection protruding from said third projecting plate and pivoted to said pivot portion, and a magnetic member embedded in said third projecting plate to be attracted by one of said first and second magnet members;

wherein said first hinge pin is attached to said projection, and has a spring member, and two hinge pin portions disposed on two opposite ends of said spring member, said pivot portion having two spaced-apart aligned pin holes to receive rotatably said hinge pin portions.

6. An eyeglass assembly comprising:

a frame unit including two spaced-apart non-looped frame strips, and a first bridge interconnecting inner ends of said frame strips;

two temples connected pivotally and respectively to said frame strips;

an eyeglass unit attached pivotally to said frame unit, and including two spaced-apart lens members, and a second bridge interconnecting said lens members; and a hinge unit disposed between said frame unit and said eyeglass unit for pivoting said eyeglass unit to said frame unit so that said eyeglass unit is pivotable relative to said frame unit between an in-use position and a non-use position;

wherein said hinge unit includes two lateral hinges connecting pivotally and respectively outer ends of said lens members to outer ends of said frame strips, said lateral hinges having third hinge parts that are fixed respectively to said outer ends of said frame strips opposite to said first bridge, and fourth hinge parts fixed respectively to said outer ends of said lens members and connected pivotally and respectively to said third hinge parts.

7. The eyeglass assembly of claim 6, further comprising two connectors that are fixed respectively to outer ends of said frame strips opposite to said first bridge and that are connected pivotally and respectively to said temples, each of said third hinge parts having a fourth projecting plate and a fifth projecting plate both of which project from one of said connectors, a corner between said fourth and fifth projecting plates, and a pivot portion disposed at said corner and having a pivot hole, each of said fourth hinge parts having a sixth projecting plate protruding from one of said outer ends of said lens members to contact one of said fourth and fifth projecting plates, and a second hinge pin extending into said pivot hole from said sixth projecting plate.

8. The eyeglass assembly of claim 7, further comprising at least one magnet and at least one magnetic member respectively disposed in one of said fourth and fifth projecting plates of one of said third hinge parts and in said sixth projecting plate of one of said fourth hinge parts, said magnetic member being attracted by said magnet.

* * * * *